United States Patent
King et al.

(10) Patent No.: US 10,189,496 B2
(45) Date of Patent: Jan. 29, 2019

(54) STEERING ASSEMBLY HAVING A TELESCOPE DRIVE LOCK ASSEMBLY

(71) Applicant: STEERING SOLUTIONS IP HOLDING CORPORATION, Saginaw, MI (US)

(72) Inventors: Todd M. King, Saginaw, MI (US); Thomas M. Finney, Midland, MI (US); Edward A. Cana, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 108 days.

(21) Appl. No.: 15/243,087

(22) Filed: Aug. 22, 2016

(65) Prior Publication Data

US 2018/0050720 A1 Feb. 22, 2018

(51) Int. Cl.
*B62D 1/181* (2006.01)
*B62D 1/184* (2006.01)
*B62D 1/183* (2006.01)

(52) U.S. Cl.
CPC .............. *B62D 1/181* (2013.01); *B62D 1/183* (2013.01); *B62D 1/184* (2013.01)

(58) Field of Classification Search
CPC .......... B62D 1/185; B62D 6/00; B62D 1/181; B62D 1/184
See application file for complete search history.

(56) References Cited

U.S. PATENT DOCUMENTS

| | | |
|---|---|---|
| 1,795,567 A | 3/1931 | Maurice |
| 3,386,309 A | 6/1968 | Reed et al. |
| 3,396,600 A | 8/1968 | Zeigler et al. |
| 3,782,492 A | 1/1974 | Hollins |
| 4,138,167 A | 2/1979 | Ernst et al. |
| 4,315,117 A | 2/1982 | Kokubu et al. |
| 4,337,967 A | 7/1982 | Yoshida et al. |
| 4,476,954 A | 10/1984 | Johnson et al. |
| 4,503,300 A | 3/1985 | Lane, Jr. |

(Continued)

FOREIGN PATENT DOCUMENTS

| | | |
|---|---|---|
| CN | 1449952 A | 10/2003 |
| CN | 1550395 A | 12/2004 |

(Continued)

OTHER PUBLICATIONS

China Patent Application No. 201510204221.5 Second Office Action dated Mar. 10, 2017, 8 pages.

(Continued)

*Primary Examiner* — Darlene P Condra
(74) *Attorney, Agent, or Firm* — Cantor Colburn LLP (57) ABSTRACT

A steering column assembly includes an upper jacket assembly, a lower jacket assembly, a telescope drive assembly, and a telescope drive lock assembly. The upper jacket assembly is at least partially received within the lower jacket assembly. The telescope drive assembly includes a telescope actuator and an extension member. The telescope drive lock assembly is operatively connected to the extension member. The telescope drive lock assembly is configured to facilitate movement of the upper jacket assembly away from the retracted position while an advanced driver assist system is active and the upper jacket assembly is in the retracted position.

18 Claims, 5 Drawing Sheets

(56) References Cited

U.S. PATENT DOCUMENTS

| | | |
|---|---|---|
| 4,503,504 A | 3/1985 | Suzumura et al. |
| 4,559,816 A | 12/1985 | Ebert et al. |
| 4,561,323 A | 12/1985 | Stromberg |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa |
| 4,691,587 A | 9/1987 | Farrand et al. |
| 4,785,684 A | 11/1988 | Nichikawa et al. |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari et al. |
| 5,590,565 A | 1/1997 | Palfenier et al. |
| 5,613,404 A | 3/1997 | Lykken et al. |
| 5,618,058 A | 4/1997 | Byon |
| 5,668,721 A | 9/1997 | Chandy |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A * | 8/1999 | Olgren .................. B62D 1/184 188/67 |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,264,239 B1 | 7/2001 | Link |
| 6,301,534 B1 | 10/2001 | McDermott, Jr. et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B2 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 8,002,075 B2 | 8/2011 | Markfort |
| 8,011,265 B2 | 9/2011 | Menjak et al. |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Dkano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,955,407 B2 | 2/2015 | Sakuma |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 | 6/2016 | Pfenninger et al. |

(56) References Cited

U.S. PATENT DOCUMENTS

| | | | |
|---|---|---|---|
| 9,360,865 B2 | 6/2016 | Yopp | |
| 9,421,994 B2 | 8/2016 | Agbor et al. | |
| 9,487,228 B2 | 11/2016 | Febre et al. | |
| 9,550,514 B2 | 1/2017 | Schulz et al. | |
| 9,616,914 B2 | 4/2017 | Stinebring et al. | |
| 9,643,641 B1 | 5/2017 | Stinebring et al. | |
| 9,663,136 B2 | 5/2017 | Stinebring et al. | |
| 9,744,983 B2 | 8/2017 | Stinebring et al. | |
| 9,828,016 B2 | 11/2017 | Lubischer et al. | |
| 9,845,106 B2 | 12/2017 | Bodtker | |
| 9,849,904 B2 | 12/2017 | Rouleau | |
| 9,852,752 B1 | 12/2017 | Chou et al. | |
| 9,862,403 B1 | 1/2018 | Rouleau et al. | |
| 9,919,724 B2 | 3/2018 | Lubischer et al. | |
| 10,065,655 B2 | 9/2018 | Bendewald et al. | |
| 2002/0171235 A1 | 11/2002 | Riefe et al. | |
| 2003/0046012 A1 | 3/2003 | Yamaguchi | |
| 2003/0094330 A1 | 5/2003 | Boloorchi et al. | |
| 2003/0146037 A1 | 8/2003 | Menjak et al. | |
| 2003/0188598 A1 | 10/2003 | Cartwright | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0046379 A1 | 3/2004 | Riefe | |
| 2004/0099083 A1 | 5/2004 | Choi et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0242562 A1 | 11/2005 | Ridgway et al. | |
| 2005/0263996 A1 | 12/2005 | Manwaring et al. | |
| 2005/0275205 A1 | 12/2005 | Ahnafield | |
| 2006/0005658 A1* | 1/2006 | Armstrong | B62D 1/184 74/492 |
| 2006/0186658 A1 | 8/2006 | Yasuhara et al. | |
| 2006/0219499 A1 | 10/2006 | Organek | |
| 2006/0224287 A1 | 10/2006 | Izawa et al. | |
| 2006/0237959 A1 | 10/2006 | Dimig et al. | |
| 2006/0244251 A1 | 11/2006 | Muller | |
| 2006/0283281 A1 | 12/2006 | Li et al. | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0096446 A1 | 5/2007 | Breed | |
| 2007/0158116 A1 | 7/2007 | Peppler | |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0047382 A1 | 2/2008 | Tomaru et al. | |
| 2008/0079253 A1 | 4/2008 | Sekii et al. | |
| 2008/0216597 A1* | 9/2008 | Iwakawa | B62D 1/181 74/493 |
| 2008/0238068 A1 | 10/2008 | Kumar et al. | |
| 2009/0024278 A1 | 1/2009 | Kondo et al. | |
| 2009/0056493 A1 | 3/2009 | Dubay et al. | |
| 2009/0107284 A1 | 4/2009 | Lucas et al. | |
| 2009/0229400 A1* | 9/2009 | Ozsoylu | B62D 1/184 74/498 |
| 2009/0256342 A1 | 10/2009 | Cymbal et al. | |
| 2009/0266195 A1 | 10/2009 | Tanke et al. | |
| 2009/0276111 A1 | 11/2009 | Wang et al. | |
| 2009/0280914 A1 | 11/2009 | Kakutani et al. | |
| 2009/0292466 A1 | 11/2009 | McCarthy et al. | |
| 2010/0152952 A1 | 6/2010 | Lee et al. | |
| 2010/0218637 A1 | 9/2010 | Barroso | |
| 2010/0222976 A1 | 9/2010 | Haug | |
| 2010/0228417 A1 | 9/2010 | Lee et al. | |
| 2010/0228438 A1 | 9/2010 | Buerkle | |
| 2010/0280713 A1 | 11/2010 | Stahlin et al. | |
| 2010/0286869 A1 | 11/2010 | Katch et al. | |
| 2010/0288567 A1 | 11/2010 | Bonne | |
| 2011/0098922 A1 | 4/2011 | Ibrahim | |
| 2011/0153160 A1 | 6/2011 | Hesseling et al. | |
| 2011/0167940 A1 | 7/2011 | Shavrnoch et al. | |
| 2011/0187518 A1 | 8/2011 | Strumolo et al. | |
| 2011/0266396 A1 | 11/2011 | Abildgaard et al. | |
| 2011/0282550 A1 | 11/2011 | Tada et al. | |
| 2012/0136540 A1 | 5/2012 | Miller | |
| 2012/0205183 A1 | 8/2012 | Rombold | |
| 2012/0209473 A1 | 8/2012 | Birsching et al. | |
| 2012/0215377 A1 | 8/2012 | Takemura et al. | |
| 2012/0247259 A1* | 10/2012 | Mizuno | B62D 1/181 74/493 |
| 2013/0002416 A1 | 1/2013 | Gazit | |
| 2013/0087006 A1 | 4/2013 | Ohtsubo et al. | |
| 2013/0104689 A1 | 5/2013 | Marutani et al. | |
| 2013/0133463 A1 | 5/2013 | Moriyama | |
| 2013/0158771 A1 | 6/2013 | Kaufmann | |
| 2013/0174686 A1 | 7/2013 | Hirche et al. | |
| 2013/0199866 A1 | 8/2013 | Yamamoto et al. | |
| 2013/0205933 A1 | 8/2013 | Moriyama | |
| 2013/0218396 A1 | 8/2013 | Moshchuk et al. | |
| 2013/0233117 A1 | 9/2013 | Read et al. | |
| 2013/0325202 A1 | 12/2013 | Howard et al. | |
| 2013/0325264 A1 | 12/2013 | Alcazar et al. | |
| 2014/0028008 A1 | 1/2014 | Stadler et al. | |
| 2014/0046542 A1 | 2/2014 | Kauffman et al. | |
| 2014/0046547 A1 | 2/2014 | Kaufmann et al. | |
| 2014/0111324 A1 | 4/2014 | Lisseman et al. | |
| 2014/0116187 A1* | 5/2014 | Tinnin | B62D 1/184 74/493 |
| 2014/0137694 A1 | 5/2014 | Sugiura | |
| 2014/0277896 A1 | 9/2014 | Lathrop et al. | |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0014086 A1 | 1/2015 | Eisenbarth | |
| 2015/0032322 A1 | 1/2015 | Wimmer | |
| 2015/0051780 A1 | 2/2015 | Hahne | |
| 2015/0060185 A1 | 3/2015 | Feguri | |
| 2015/0120142 A1 | 4/2015 | Park et al. | |
| 2015/0137492 A1 | 5/2015 | Rao et al. | |
| 2015/0203145 A1 | 7/2015 | Sugiura et al. | |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2016/0009332 A1 | 1/2016 | Sirbu | |
| 2016/0016604 A1 | 1/2016 | Johta et al. | |
| 2016/0075371 A1 | 3/2016 | Varunkikar et al. | |
| 2016/0082867 A1 | 3/2016 | Sugioka et al. | |
| 2016/0114828 A1 | 4/2016 | Tanaka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1 | 8/2016 | Bendewald et al. | |
| 2016/0244086 A1 | 8/2016 | Moriyama | |
| 2016/0318540 A1 | 11/2016 | King | |
| 2016/0318542 A1 | 11/2016 | Pattok et al. | |
| 2016/0347347 A1 | 12/2016 | Lubischer | |
| 2016/0347348 A1 | 12/2016 | Lubischer | |
| 2016/0362084 A1 | 12/2016 | Martin et al. | |
| 2016/0362117 A1 | 12/2016 | Kaufmann et al. | |
| 2016/0362126 A1 | 12/2016 | Lubischer | |
| 2016/0368522 A1 | 12/2016 | Lubischer | |
| 2016/0375770 A1 | 12/2016 | Ryne et al. | |
| 2016/0375860 A1 | 12/2016 | Lubischer | |
| 2016/0375923 A1 | 12/2016 | Schulz | |
| 2016/0375924 A1 | 12/2016 | Bodtker et al. | |
| 2016/0375925 A1 | 12/2016 | Lubischer et al. | |
| 2016/0375926 A1 | 12/2016 | Lubischer et al. | |
| 2016/0375927 A1 | 12/2016 | Schulz | |
| 2016/0375928 A1 | 12/2016 | Magnus | |
| 2016/0375929 A1 | 12/2016 | Rouleau | |

(56) References Cited

U.S. PATENT DOCUMENTS

| | | |
|---|---|---|
| 2016/0375931 A1 | 12/2016 | Lubischer |
| 2017/0029009 A1 | 2/2017 | Rouleau |
| 2017/0029018 A1 | 2/2017 | Lubischer |
| 2017/0097071 A1 | 4/2017 | Galehr |
| 2017/0106894 A1 | 4/2017 | Bodtker |
| 2017/0113589 A1 | 4/2017 | Riefe |
| 2017/0113712 A1 | 4/2017 | Watz |
| 2017/0151975 A1 | 7/2017 | Schmidt et al. |
| 2017/0294120 A1 | 10/2017 | Ootsuji |
| 2017/0297606 A1 | 10/2017 | Kim et al. |
| 2017/0341677 A1 | 11/2017 | Buzzard et al. |
| 2017/0361863 A1 | 12/2017 | Rouleau |
| 2017/0369091 A1 | 12/2017 | Nash |
| 2018/0029628 A1 | 2/2018 | Sugishita |
| 2018/0072339 A1 | 3/2018 | Bodtker |
| 2018/0079441 A1 | 3/2018 | McKinzie et al. |
| 2018/0086378 A1 | 3/2018 | Bell et al. |
| 2018/0148084 A1 | 5/2018 | Nash et al. |
| 2018/0154932 A1 | 6/2018 | Rakouth et al. |
| 2018/0251147 A1 | 9/2018 | Heitz et al. |
| 2018/0273081 A1 | 9/2018 | Lubischer et al. |

FOREIGN PATENT DOCUMENTS

| | | |
|---|---|---|
| CN | 1722030 | 1/2006 |
| CN | 1736786 | 2/2006 |
| CN | 101037117 | 9/2007 |
| CN | 101041355 | 9/2007 |
| CN | 101049814 A | 10/2007 |
| CN | 101291840 A | 10/2008 |
| CN | 101402320 A | 4/2009 |
| CN | 101596903 | 12/2009 |
| CN | 201534560 U | 7/2010 |
| CN | 101954862 A | 1/2011 |
| CN | 102161346 A | 8/2011 |
| CN | 102452391 | 5/2012 |
| CN | 102523738 A | 6/2012 |
| CN | 102574545 A | 7/2012 |
| CN | 202337282 U | 7/2012 |
| CN | 102806937 A | 12/2012 |
| CN | 103085854 A | 5/2013 |
| CN | 103419840 | 12/2013 |
| CN | 103448785 A | 12/2013 |
| CN | 103569185 A | 2/2014 |
| CN | 103587571 A | 2/2014 |
| CN | 203793405 U | 8/2014 |
| CN | 204222957 | 3/2015 |
| DE | 1310431 A1 | 10/1994 |
| DE | 19523214 A1 | 1/1997 |
| DE | 19923012 | 11/2000 |
| DE | 19954505 A1 | 5/2001 |
| DE | 10212782 A1 | 10/2003 |
| DE | 102005032528 | 1/2007 |
| DE | 102005056438 A1 | 6/2007 |
| DE | 102006025254 | 12/2007 |
| DE | 1020081057313 A1 | 10/2009 |
| DE | 102010025197 A1 | 12/2011 |
| DE | 102013110865 A1 | 4/2015 |
| DE | 102015216326 B4 | 9/2016 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S60157963 | 8/1985 |
| JP | H05162652 | 6/1993 |
| JP | 2007253809 A | 10/2007 |
| KR | 20100063433 A | 6/2010 |
| KR | 101062339 B1 | 9/2011 |
| WO | 2006099483 A1 | 9/2006 |
| WO | 2010082394 A1 | 7/2010 |
| WO | 2010116518 | 10/2010 |
| WO | 2014208573 A1 | 12/2014 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English translation regarding DE102015216326B4, ThyssenKrupp AG; 21 pgs.
Chinese Office Action & Search Report for Chinese Application No. 201610427896.0 dated Oct. 27, 2017, 16 pages, English Translation Included.
Chinese Office Action & Search Report for Chinese Application No. 201610609647.3 dated Mar. 12, 2018, 5 pages, no English translation available.
Chinese Office Action & Search Report for Chinese Application No. 201610620335.2 dated Jan. 22, 2018, 15 pages, English Translation Included.
Chinese Office Action & Search Report for Chinese Application No. 201610642300.9 dated Feb. 7, 2018, 22 pages, English Translation Only.
Chinese Office Action & Search Report for Chinese Application No. 201610651953.3 dated Jan. 25, 2018, 12 pages, English Translation Included.
Chinese Office Action & Search Report for Chinese Application No. 201610830808.1 dated Apr. 3, 2018, 30 pages, English Translation Included.
Chinese Office Action & Search Report for Chinese Application No. 201610830809.6 dated Mar. 12, 2018, 11 pages, English Translation Included.
Chinese Office Action & Search Report for Chinese Application No. 201610830810.9 dated Jan. 31, 2018, 18 pages, English Translation Included.

(56) References Cited

OTHER PUBLICATIONS

Chinese Office Action & Search Report for Chinese Application No. 201611113746.9 dated May 4, 2018, 11 pages, English Translation Included.
Chinese Office Action for Chinese Application No. 2016104278960 dated May 28, 2018 16 pages, English Translation Included.
CN Chinese Office Action & Search Report for Chinese Application No. 201610620335.2 dated Aug. 7, 2018, 16 pages, English Translation Included.

\* cited by examiner

STEERING ASSEMBLY HAVING A TELESCOPE DRIVE LOCK ASSEMBLY

BACKGROUND OF THE INVENTION

Vehicle steering wheels are typically used to provide directional control of a vehicle. Autonomous vehicles are provided with advanced sensors, electronics, and controllers to provide directional control of the vehicle without driver intervention. An operator of the autonomous vehicle may be able to perform non-driving activities while the autonomous vehicle is controlled by the advanced sensors, electronics, or controllers.

SUMMARY OF THE INVENTION

According to an embodiment of the present disclosure, a steering column assembly is provided. The steering column assembly includes an upper jacket assembly that is at least partially received within a lower jacket assembly, a telescope drive assembly, and a telescope drive lock assembly. The telescope drive assembly includes a telescope actuator and an extension member. The telescope actuator is disposed on the lower jacket assembly. The extension member is operatively connected to the telescope actuator and the lower jacket assembly. The telescope actuator and the extension member are arranged to move the upper jacket assembly between an extended position and a retracted position in response to activation of the advanced driver assist system. The telescope drive lock assembly is operatively connected to the extension member. The telescope drive lock assembly is configured to facilitate movement of the upper jacket assembly away from the retracted position while the advanced driver assist system is active and the upper jacket assembly is in the retracted position.

According to another embodiment of the present disclosure, a steering column assembly is provided. The steering column assembly is in communication with an advanced driver assist system that is configured to selectively control an autonomous or semiautonomous vehicle. The steering column assembly includes an extension member and a telescope drive lock assembly. The extension member is operatively connected to a telescope actuator at a first end and operatively connected to a jacket assembly at a second end. The extension member and the telescope actuator are arranged to move the jacket assembly between an extended position and a retracted position. The telescope drive lock assembly includes a mounting bracket, a first split nut, a second split nut, an engagement member, a split nut actuator, and a biasing member. The mounting bracket is slidably connected to the jacket assembly. The first split nut and the second split nut are each disposed at least partially about the extension member and are each pivotally connected to the mounting bracket. The engagement member is operatively connected to the mounting bracket and the first split nut and the second split nut. The split nut actuator is operatively connected to the jacket assembly and is disposed proximate the first end of the extension member. The biasing member extends from a retainer plate that is operatively connected to the jacket assembly and is disposed proximate the second end of the extension member.

According to yet another embodiment of the present disclosure, a telescope drive lock assembly is provided. The telescope drive lock assembly includes a mounting bracket, a first split nut, a second split nut, an engagement member, and a split nut actuator. The mounting bracket is operatively connected to a jacket assembly. The first split nut and the second split nut are pivotally connected to the mounting bracket and are disposed at least partially about an extension member of a telescope drive assembly. The telescope drive assembly is configured to move the jacket assembly between an extended position and a retracted position in response to activation of an advanced driver assist system. The engagement member is operatively connected to the mounting bracket and the first split nut and the second split nut. The engagement member is movable between a first position and a second position. The split nut actuator is operatively connected to the jacket assembly and is disposed proximate a first end of the extension member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
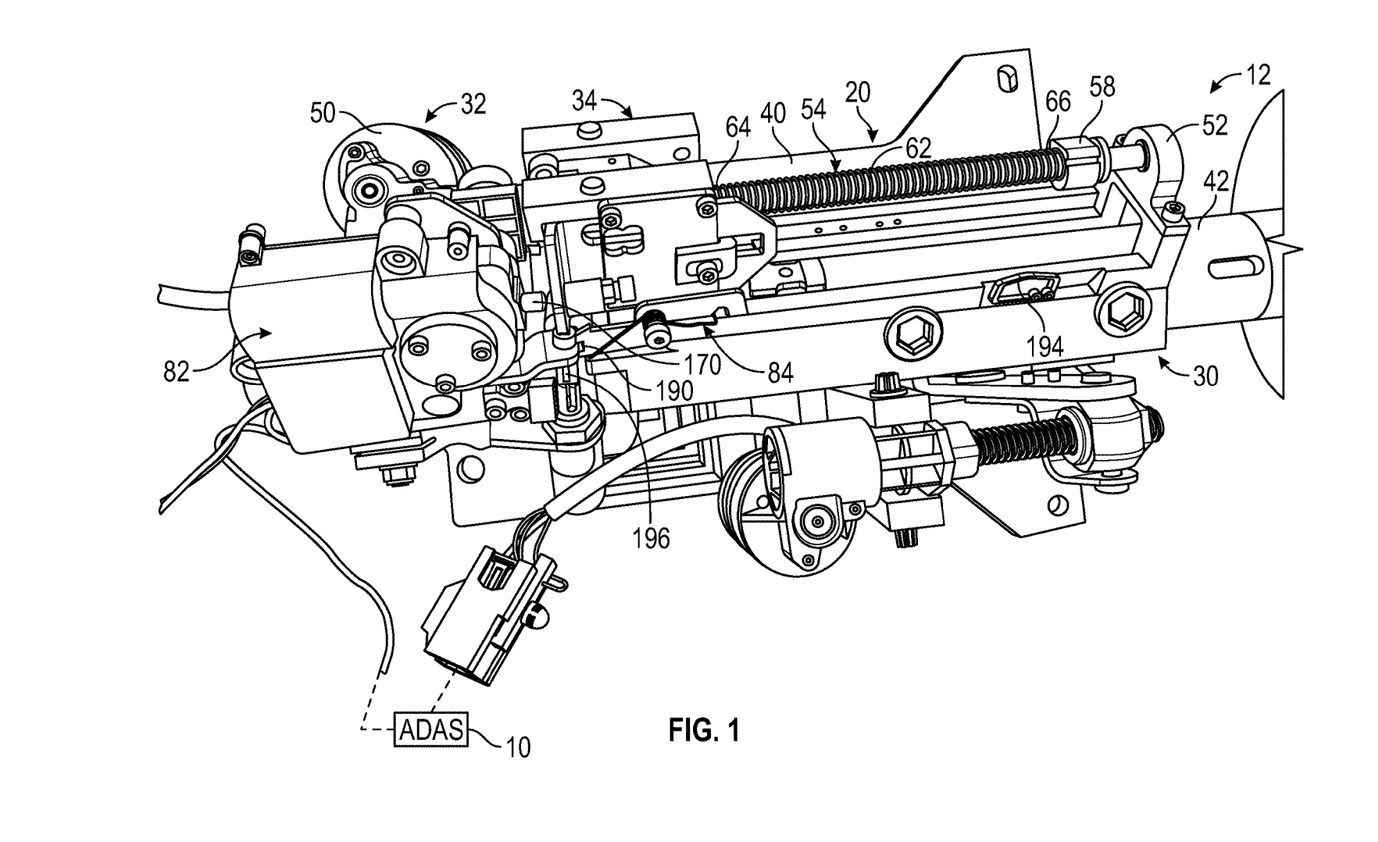
FIG. 1 is a perspective view of a steering assembly having a telescope drive lock assembly.

A vehicle such as an autonomous vehicle, an autonomously driven vehicle, or a selectively autonomous vehicle. Referring to FIG. 1, the vehicle is provided with advanced driver assist system 10 and a steering assembly 12.

The advanced driver assist system (ADAS) 10 is configured to selectively control the autonomous vehicle, the autonomously driven vehicle, or the selectively autonomous vehicle using sensing, steering, and/or braking technology without continuous input from a driver (e.g. steering, accelerating, braking, maneuvering, etc.). A driver of the vehicle is able to selectively activate or deactivate the ADAS 10 via a switch or other mechanism. A vehicle monitoring system is able to selectively activate or deactivate the ADAS 10 in response to events occurring internally or externally to the vehicle. The ADAS 10 is in communication with the steering assembly 12.

The steering assembly 12 includes a steering column assembly 20. The steering column assembly 20 includes a steering wheel that is configured to selectively receive and/or provide directional control to the vehicle from a driver of the vehicle based on the operational state of the ADAS 10. The driver of the vehicle is able to provide directional control of the vehicle while the ADAS 10 is deactivated. The ADAS 10 is configured to provide directional control of the vehicle while the ADAS 10 is activated. The steering wheel of the steering column assembly 20 may be operatively decoupled from the steering column assembly 20 while the ADAS 10 is activated. It is to be appreciated that "decoupling" the steering wheel from the steering column assembly 20 may be done mechanically, electrically, or a combination thereof.

The steering column assembly 20 includes a jacket assembly 30, a telescope drive assembly 32, and a telescope drive lock assembly 34. The jacket assembly 30 is telescopically adjustable and includes a lower jacket assembly 40 and an upper jacket assembly 42. The lower jacket assembly 40 is connected to a vehicle structure. The lower jacket assembly 40 defines an opening that at least partially receives the upper jacket assembly 42.

The combination of the steering wheel and the upper jacket assembly 42 is translatable along a steering column axis to telescopically adjust a position of the combination of the steering wheel coupled to the upper jacket assembly 42. The telescope drive assembly 32 is configured to translate the upper jacket assembly 42 relative to the lower jacket assembly 40.

The telescope drive assembly 32 is operatively connected to the upper jacket assembly 42 and the lower jacket assembly 40. The telescope drive assembly 32 includes a telescope actuator 50, a telescope drive bracket 52, an extension member 54, a first travel stop 56, and a second travel stop 58.

The telescope actuator 50 is disposed on the lower jacket assembly 40. The telescope drive bracket 52 is disposed on the lower jacket assembly 40 and is spaced apart from the telescope actuator 50. The telescope actuator 50 is operatively connected to the telescope drive bracket 52 by the extension member 54.

The extension member 54 is configured as a lead screw that extends between the telescope actuator 50 and the telescope drive bracket 52. The extension member 54 includes an extension member body 62 that extends between a first end 64 and a second end 66. The first end 64 is operatively connected to the telescope actuator 50. The second end 66 is operatively connected to the telescope drive bracket 52 that is operatively connected to the lower jacket assembly 40. The telescope actuator 50 imparts rotary motion to the extension member 54 and the telescope drive bracket 52 converts the rotary motion into linear motion to translate the upper jacket assembly 42 along the steering column axis relative to the lower jacket assembly 40.

The telescope actuator 50, the telescope drive bracket 52, and the extension member 54 are arranged to move the upper jacket assembly 42 between an extended position and a retracted position in response to activation of the ADAS 10. The extended position corresponds to a driving position of the steering wheel that is operatively connected to the upper jacket assembly 42 while the ADAS 10 is deactivated. The retracted position corresponds to a non-driving position of the steering wheel that is operatively connected to the upper jacket assembly 42 while the ADAS 10 is activated. The telescope actuator 50 may be an electronic actuator, hydraulic actuator, pneumatic actuator, or the like.

The first travel stop 56 is disposed about the first end 64 of the extension member 54. The first travel stop 56 is disposed between the telescope actuator 50 and the telescope drive lock assembly 34. The first travel stop 56 is configured to inhibit or stop further travel of at least one of the telescope drive lock assembly 34 and the upper jacket assembly 42 towards the retracted position.

The second travel stop 58 is disposed about the second end 66 of the extension member 54. The second travel stop 58 is disposed between the telescope drive bracket 52 and the telescope drive lock assembly 34. The second travel stop 58 is configured to inhibit or stop further travel of at least one of the telescope drive lock assembly 34 and the upper jacket assembly 42 towards the extended position.

The driver of the vehicle is able to manually move the steering wheel operatively connected to the upper jacket assembly 42 of the steering column assembly 20 from the retracted position towards the extended position while the ADAS 10 is active and controlling the vehicle. The manual movement of the steering wheel operatively connected to the upper jacket assembly 42 of the steering column assembly 20 from the retracted position towards the extended position overrides the operation of the ADAS 10 and hands over control of the vehicle to the driver of the vehicle. The telescope drive lock assembly 34 is configured to enable the driver of the vehicle to temporarily disable or override the functionality of the telescope drive assembly 32 by releasing a component from engagement with the extension member 54.

Referring to FIGS. 1 and 3-5, the telescope drive lock assembly 34 is operatively connected to the lower jacket assembly 40 and the extension member 54. Referring to FIGS. 1-5, the telescope drive lock assembly 34 includes a mounting bracket 70, an engagement member 74, a mounting plate 76, a first split nut assembly 78, a second split nut assembly 80, a split nut actuator 82, and an engagement member locking assembly 84.

Figure 2:
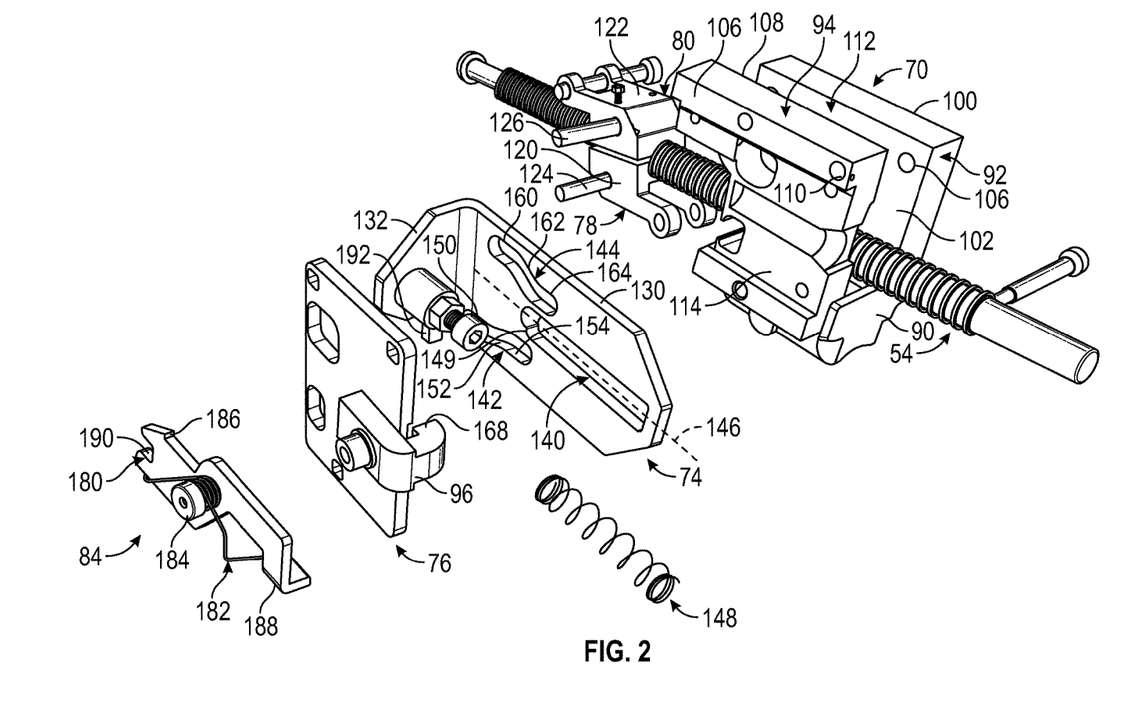
FIG. 2 is a disassembled view of the telescope drive lock assembly.

The mounting bracket 70 is operatively and slidably connected to the lower jacket assembly 40. The mounting bracket 70 includes a base portion 90, a first mounting arm 92, and a second mounting arm 94. The base portion 90 is configured to slidably engage the lower jacket assembly 40.

The first mounting arm 92 extends from a first end of the base portion 90 away from the lower jacket assembly 40. The first mounting arm 92 includes a first surface 100, a second surface 102 disposed opposite the first surface 100, and at least one mounting hole 104. The first surface 100 defines an exterior surface of the mounting bracket 70. The second surface 102 defines an interior surface of the mounting bracket 70. The at least one mounting hole 104 extends from the first surface 100 towards the second surface 102.

The second mounting arm 94 extends from a second end of the base portion 90 away from the lower jacket assembly 40. The second mounting arm 94 is disposed substantially parallel to the first mounting arm 92. The second mounting arm 94 includes a third surface 106, a fourth surface 108 disposed opposite the third surface 106, and at least one additional mounting hole 110. The third surface 106 defines an exterior surface of the mounting bracket 70. The fourth surface 108 defines an interior surface of the mounting bracket 70. The fourth surface 108 faces towards and is spaced apart from the second surface 102. The at least one additional mounting hole 110 extends from the fourth surface 108 towards the third surface 106.

The second surface 102, the base portion 90, and the fourth surface 108 define a receiving region 112. At least a portion of the extension member 54 is received within the receiving region 112 such that the mounting bracket 70 is at least partially disposed about a portion of the extension member 54.

The second mounting arm 94 of the mounting bracket 70 defines a recess 114. The recess 114 extends from the third surface 106 towards the fourth surface 108.

The first split nut assembly 78 and the second split nut assembly 80 are each received within the receiving region 112 of the mounting bracket 70. The first split nut assembly 78 and the second split nut assembly 80 are each pivotally connected to the mounting bracket 70. The first split nut assembly 78 and the second split nut assembly 80 are each at least partially disposed about the extension member 54. The first split nut assembly 78 and the second split nut assembly 80 are movable between an open position in which the first split nut assembly 78 and the second split nut assembly 80 are spaced apart from each other and do not engage the threads of the extension member 54 and a closed position in which the first split nut assembly 78 and the second split nut assembly 80 engage each other and engage the threads of the extension member 54. The first split nut assembly 78 and the second split nut assembly 80 facilitate or permit a driver of the vehicle to manually move the steering wheel attached to the upper jacket assembly 42 between or away from at least one of the extended position and the retracted position while the first split nut assembly 78 and the second split nut assembly 80 are in the open position. The first split nut assembly 78 and the second split nut assembly 80 inhibit or restrict the driver of the vehicle to manually move the steering wheel connected to the upper jacket assembly 42 between or away from at least one of the extended position and the retracted position while the first split nut assembly 78 and the second split nut assembly 80 are in the closed position.

The first split nut assembly 78 includes a first split nut 120 that is pivotally connected to the first mounting arm 92 and the second mounting arm 94 of the mounting bracket 70 by a first fastener 124 that extends through the at least one mounting hole 104 and the at least one additional mounting hole 110. The first split nut 120 includes a pair of internal threads that are configured to selectively engage the extension member 54.

The second split nut assembly 80 includes a second split nut 122 is pivotally connected to the first mounting arm 92 and the second mounting arm 94 of the mounting bracket 70 by a second fastener 126 that extends through the at least one mounting hole 104 and the at least one additional mounting hole 110. The second split nut 122 includes a pair of internal threads are configured to selectively engage the extension member 54.

The internal threads of the first split nut 120 and the internal threads of the second split nut 122 are configured to engage the threads of the extension member 54 when the first split nut assembly 78 and the second split nut assembly 80 are in the closed position. The internal threads of the first split nut 120 and the internal threads of the second split nut 122 are spaced apart from the threads of the extension member 54 when the first split nut assembly 78 and the second split nut assembly 80 are in the open position.

The engagement member 74 is operatively connected to the mounting bracket 70 and the first split nut assembly 78 and the second split nut assembly 80. The engagement member 74 is at least partially received within the recess 114 of the second mounting arm 94 of the mounting bracket 70. The engagement member 74 is movable between a first position and a second position. The first position of the engagement member 74 corresponds to the closed position of the first split nut assembly 78 and the second split nut assembly 80. The second position of the engagement member 74 corresponds to the open position of the first split nut assembly 78 and the second split nut assembly 80.

The engagement member 74 includes a first portion 130 and a second portion 132 that extends from the first portion 130. The first portion 130 slidably received within the recess 114 of the second mounting arm 94 of the mounting bracket 70. The first portion 130 defines a guide slot 140, a first actuation slot 142, and a second actuation slot 144.

The guide slot 140 is disposed along a centerline 146 of the engagement member 74. The centerline 146 of the engagement member 74 is disposed substantially parallel to a direction of travel of the engagement member 74 in which the engagement member 74 travels between the first position and the second position. The guide slot 140 extends from an end of the engagement member that is spaced apart from the second portion 132 towards the first actuation slot 142 and the second actuation slot 144.

The guide slot 140 is configured to receive a spring 148. A first portion of the spring 148 engages a notch or recess 149 that is formed proximate an end of the guide slot 140.

The first actuation slot 142 is laterally spaced apart from and longitudinally spaced apart from the guide slot 140. The first actuation slot 142 is disposed on a first side of the centerline 146. The first actuation slot 142 includes a first actuation slot first portion 150, a first actuation slot second portion 152, and a first actuation slot third portion 154. The first actuation slot first portion 150 is oriented substantially parallel to the centerline 146. The first actuation slot first portion 150 is disposed further from the centerline 146 than the first actuation slot second portion 152 and the first actuation slot third portion 154. The first split nut 120 of the first split nut assembly 78 is in the open position when the first fastener 124 is disposed or received within the first actuation slot first portion 150. The first actuation slot third portion 154 is oriented substantially parallel to the centerline 146. The first actuation slot third portion 154 is disposed closer to the centerline 146 than the first actuation slot first portion 150 and the first actuation slot second portion 152. The first split nut 120 of the first split nut assembly 78 is in the closed position when the first fastener 124 is disposed or received within the first actuation slot third portion 154. The first actuation slot second portion 152 extends between the first actuation slot first portion 150 and the first actuation slot third portion 154. The first actuation slot second portion 152 is disposed at an angle relative to the first actuation slot first portion 150 and the first actuation slot third portion 154. The first actuation slot second portion 152 is angled towards the centerline 146.

The second actuation slot 144 is laterally spaced apart from and is longitudinally spaced apart from the guide slot 140. The second actuation slot 144 is laterally spaced apart from the first actuation slot 142. The second actuation slot 144 is disposed on a second side of the centerline 146 that is disposed opposite the first side of the centerline 146. The second actuation slot 144 includes a second actuation slot first portion 160, a second actuation slot second portion 162, and a second actuation slot third portion 164. The second actuation slot first portion 160 is oriented substantially parallel to the centerline 146. The second actuation slot first portion 160 is disposed further from the centerline 146 than the second actuation slot second portion 162 and the second actuation slot third portion 164. The second split nut 122 of the second split nut assembly 80 is in the open position when the second fastener 126 is disposed or received within the second actuation slot first portion 160. The second actuation slot third portion 164 is oriented substantially parallel to the centerline 146. The second actuation slot third portion 164 is disposed closer to the centerline of 146 than the second actuation slot first portion 160 and the second actuation slot second portion 162. The second split nut 122 of the second split nut assembly 80 is in the closed position when the second fastener 126 is disposed or received within the second actuation slot third portion 164. The second actuation slot second portion 162 extends between the second actuation slot first portion 160 and the second actuation slot third portion 164. The second actuation slot second portion 162 is disposed at an angle relative to the second actuation slot first portion 160 and the second actuation slot third portion 164. The second actuation slot second portion 162 is angled towards the centerline 146.

The second portion 132 of the engagement member 74 is disposed substantially perpendicular to the first portion 130 of the engagement member 74. The second portion 132 extends towards the first split nut assembly 78. A portion of the first split nut assembly 78 is configured to selectively engage the second portion 132 of the engagement member 74 to move the engagement member 74 between the closed position and the open position.

The mounting plate 76 is disposed on the second mounting arm 94 of the mounting bracket 70. The mounting plate 76 is disposed over the recess 114 of the second mounting arm 94 of the mounting bracket 70. The mounting plate 76 is configured to secure the engagement member 74 to the second mounting arm 94 of the mounting bracket 70. The mounting plate 76 includes a guide feature 96 that is at least partially received within the guide slot 140 of the engagement member 74.

A second portion of the spring 148 engages a guide feature surface 168 of the guide feature 96. The engagement of the spring 148 between the recess 149 of the guide slot 140 and the guide feature surface 168 of the guide feature 96 enables the spring 148 to provide a preload to the engagement member 74 to maintain a position of the engagement member 74, i.e. the first position or second position, that allows the first split nut assembly 78 and the second split nut assembly 80 to maintain engagement with or disengagement from the extension member 54.

The split nut actuator 82 is spaced apart from the telescope actuator 50 of the telescope drive assembly 32. The split nut actuator 82 is disposed proximate the first end 64 of the extension member 54. The split nut actuator 82 has a plunger 170 that extends towards the second portion 132 of the engagement member 74.

Figure 3:
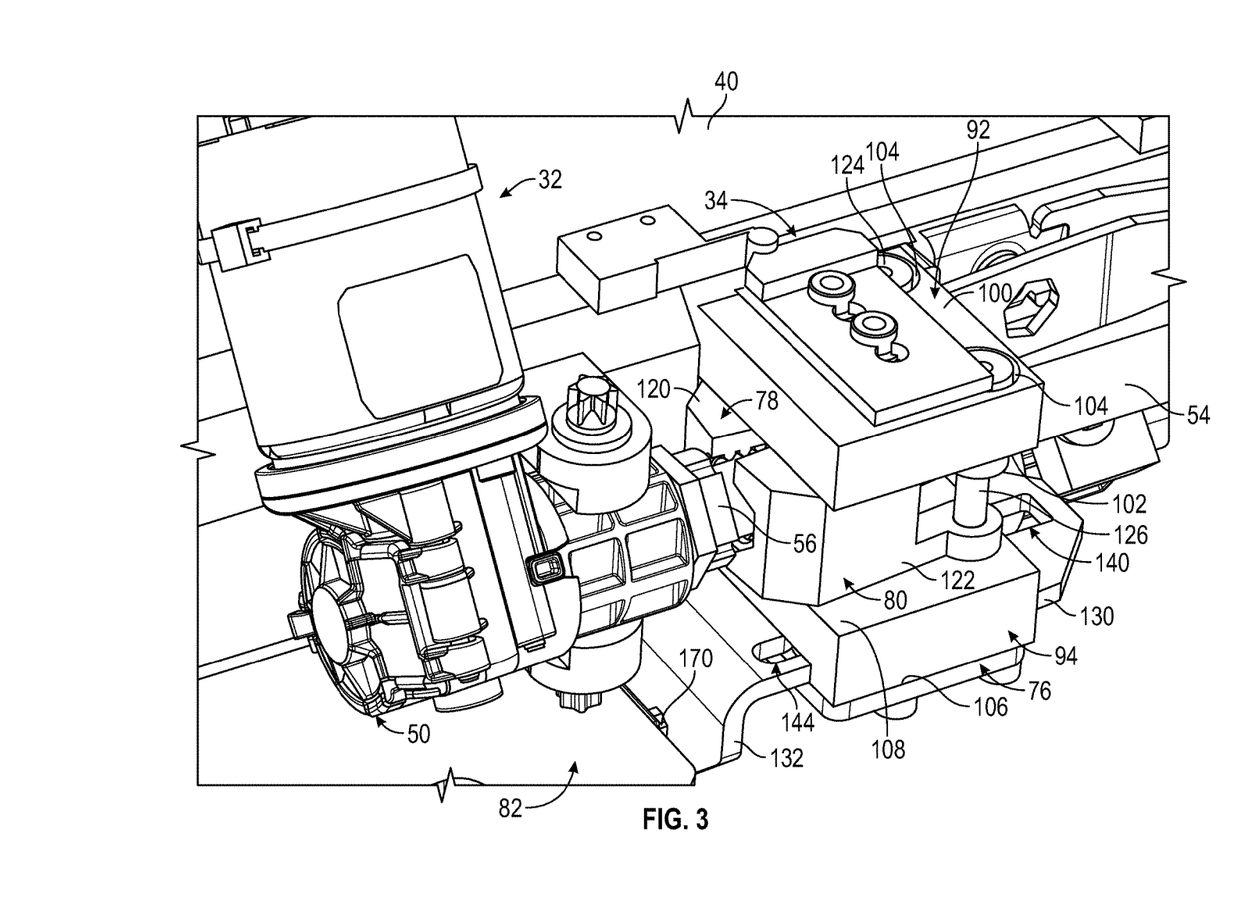
FIG. 3 is a partial view of the telescope drive lock assembly operatively connected to a jacket assembly of the steering assembly.
Figure 4:
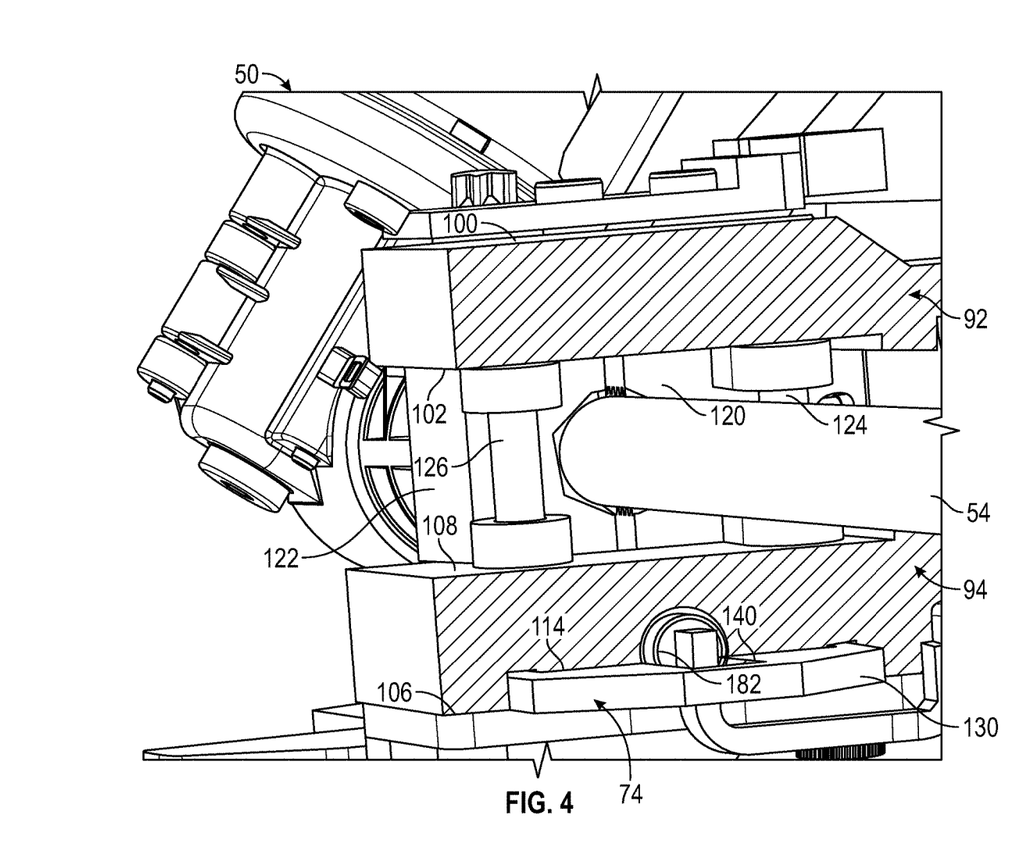
FIG. 4 is a partial perspective view of the telescope drive lock assembly operatively connected to the jacket assembly in a retracted position and the telescope drive lock assembly in an open position.

Referring to FIGS. 1 and 3, the plunger 170 of the split nut actuator is configured to engage the second portion 132 of the engagement member 74 while the upper jacket assembly 42 moves from the extended position towards the retracted position. The plunger 170 of the split nut actuator 82 is configured to move the engagement member 74 from the second position towards the first position, to move the first split nut assembly 78 and the second split nut assembly 80 from the closed position towards the open position in response to the upper jacket assembly 42 moving towards or substantially achieving the retracted position. The respective fasteners received within their respective actuation slot move from the third portion towards the first portion. The movement of the first split nut assembly 78 and the second split nut assembly 80 from the closed position towards the open position enables or facilitates a driver of the vehicle to manually move the steering wheel connected to the upper jacket assembly 42 from the retracted position towards the extended position.

The engagement member locking assembly 84 is configured to ensure that the engagement member 74 is maintained in the first position or the second position to maintain the first split nut assembly 78 and the second split nut assembly 80 in the closed position or the open position.

The engagement member locking assembly 84 includes an engagement member locking bracket 180, a biasing member 182, and a mounting fastener 184. The engagement member locking bracket 180 has first feature surface 186, a second feature surface 188, and a feature slot 190. The first feature surface 186 is configured to operatively engage an engagement surface 192 that extends from a portion of the engagement member 74. The engagement member 74 is maintained in a substantially constant position at least until the upper jacket assembly 42 substantially achieves the extended position in which the second feature surface 188 engages or makes contact with a cam surface 194 of the lower jacket assembly 40. The engagement between the second feature surface 188 and the cam surface 194 of the lower jacket assembly 40 enables the engagement member 74 to be moved between the second position and the first position to lock or move the first split nut assembly 78 and the second split nut assembly 80 towards the closed position. The engagement member 74 is maintained in a substantially constant position at least until the upper jacket assembly 42 substantially achieves the retracted position in which the feature slot 190 engages or contacts a latching bracket 196 of the lower jacket assembly 40. The engagement between the feature slot 190 and the latching bracket 196 enables the engagement member 74 to be moved between the first position and the second position to unlock or move the first split nut assembly 78 and the second split nut assembly 80 towards the open position.

The engagement member locking assembly 84 is pivotally connected to the mounting plate 76 and the mounting bracket 70 by the mounting fastener 184. The biasing member 182 is disposed about the mounting fastener 184.

Figure 5:
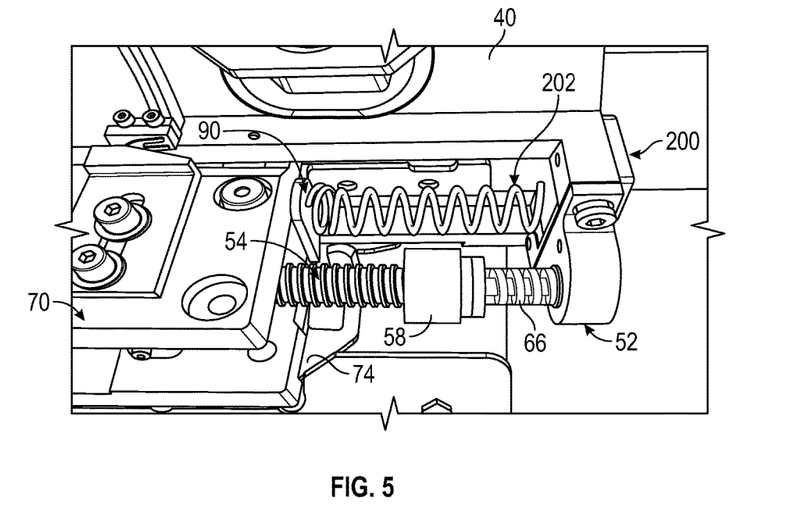
FIG. 5 is a partial perspective view of the telescope drive lock assembly operatively connected to the jacket assembly in an extended position and the telescope drive lock assembly in a closed position.
Figure 6:
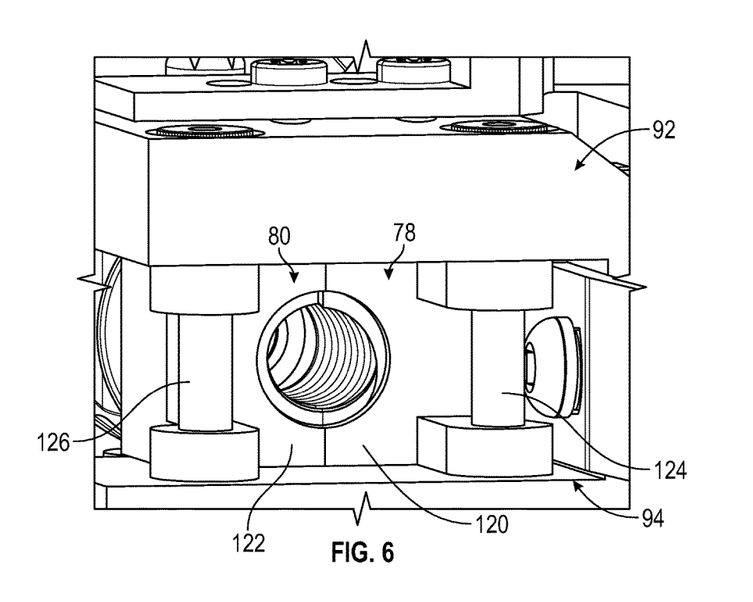
FIG. 6 is a partial perspective view of the telescope drive lock assembly in the closed position.

Referring to FIGS. 5 and 6, a retainer plate 200 and a biasing member 202 are provided with the steering column assembly 20. The retainer plate 200 and the biasing member 202 are spaced apart from and disposed opposite the split nut actuator 82. The retainer plate 200 and the biasing member 202 are each disposed proximate the second end 66 of the extension member 54. The retainer plate 200 is operatively connected to the lower jacket assembly 40. The retainer plate 200 extends from the lower jacket assembly 40 towards the base portion 90 of the mounting bracket 70. The retainer plate 200 includes a retention feature that is configured to operatively connect the biasing member 202 to the retainer plate 200.

The biasing member 202 extends from the retainer plate 200 towards the base portion 90 of the mounting bracket 70. The biasing member 202 is configured to engage the base portion 90 of the mounting bracket 70 while the upper jacket assembly 42 moves from the retracted position towards the extended position. The biasing member 202 is configured to bias base the mounting bracket 70 towards the first end 64 of the extension member 54 to move the first split nut assembly 78 and the second split nut assembly 80 relative to the engagement member 74, to move the first split nut assembly 78 and the second split nut assembly 80 from the open position towards the closed position in response to the upper jacket assembly 42 being manually moved towards or substantially achieving the extended position.

The movement of the mounting bracket 70 relative to the engagement member 74 moves the engagement member 74 from the second position towards the first position. The respective fasteners received within their respective actuation slot move from the first portion towards the third portion. The movement of the first split nut assembly 78 and the second split nut assembly 80 from the open position towards the closed position causes the first split nut assembly 78 and the second split nut assembly 80 to close and engage the extension member 54 to inhibit movement of the upper jacket assembly 42 away from the extended position to ensure that the first split nut assembly 78 and the second split nut assembly 80 of the telescope drive lock assembly 34 is fully engaged to maintain its position and enable functionality of the telescope actuator 50 of the telescope drive assembly 32.

Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
an upper jacket assembly at least partially received within a lower jacket assembly, and
a telescope drive assembly, comprising:
a telescope actuator disposed on the lower jacket assembly, and
an extension member operatively connected to the telescope actuator and the lower jacket assembly, the telescope actuator and the extension member arranged to move the upper jacket assembly between an extended position and a retracted position, and
a telescope drive lock assembly operatively connected to the extension member, the telescope drive lock assembly being configured to facilitate movement of the upper jacket assembly away from the retracted position while the upper jacket assembly is in the retracted position, the telescope drive lock assembly, comprising:
a mounting bracket;
a first split nut assembly and a second split nut assembly disposed at least partially about the extension member, the first split nut assembly having a first split nut pivotally connected to the mounting bracket and the second split nut assembly having a second split nut pivotally connected to the mounting bracket;
an engagement member operatively connected to the mounting bracket and the first split nut assembly and the second split nut assembly; and
a split nut actuator operatively connected to the lower jacket assembly, the split nut actuator having a plunger extending towards the engagement member.

2. The steering column assembly of claim 1, wherein the first split nut assembly and the second split nut assembly are movable between an open position in which the first split nut and the second split nut are spaced apart from the extension member and a closed position in which the first split nut and the second split nut engage the extension member.

3. The steering column assembly of claim 2, wherein the engagement member is movable between a first position that corresponds to the closed position of the first split nut assembly and the second split nut assembly and a second position that corresponds to the open position of the first split nut assembly and the second split nut assembly.

4. The steering column assembly of claim 3, wherein while the lower jacket assembly is in the retracted position the plunger of the split nut actuator engages the engagement member and moves the engagement member from the first position towards the second position to move the first split nut assembly and the second split nut assembly from the closed position towards the open position.

5. The steering column assembly of claim 3, wherein the telescope drive assembly further including:
a first travel stop disposed between the telescope actuator and the first split nut assembly and the second split nut assembly.

6. A steering column assembly is in communication with an advanced driver assist system that is configured to selectively control an autonomous or semiautonomous vehicle, the steering column assembly, comprising:
an extension member operatively connected to a telescope actuator at a first end and operatively connected to a jacket assembly at a second end, the extension member and the telescope actuator being arranged to move the jacket assembly between an extended position and a retracted position; and
a telescope drive lock assembly, comprising:
a mounting bracket slidably connected to the jacket assembly,
a first split nut and a second split nut disposed at least partially about the extension member and each being pivotally connected to the mounting bracket,
an engagement member operatively connected to the mounting bracket and the first split nut and the second split nut,
a split nut actuator operatively connected to the jacket assembly and disposed proximate the first end of the extension member; and
a biasing member extending from a retainer plate that is operatively connected to the jacket assembly and disposed proximate the second end of the extension member.

7. The steering column assembly of claim 6, wherein in response to the jacket assembly moving towards the retracted position, the split nut actuator engages the engagement member to move the first split nut and the second split nut from a closed position towards an open position in which the first split nut and the second split nut are spaced apart from the extension member.

8. The steering column assembly of claim 6, wherein in response to the jacket assembly moving towards the extended position, the biasing member engages the engagement member to move the first split nut and the second split nut from an open position towards a closed position in which the first split nut and the second split nut engage the extension member.

9. The steering column assembly of claim 6, wherein the mounting bracket defines a recess that slidably receives the engagement member.

10. The steering column assembly of claim 6, further comprising:
a mounting plate disposed on the mounting bracket, the mounting plate configured to secure the engagement member to the mounting bracket.

11. The steering column assembly of claim 6, further comprising a first travel stop disposed about the extension member and disposed between the telescope actuator and the first split nut and the second split nut.

12. The steering column assembly of claim 11, further comprising a second travel stop disposed about the second end of the extension member.

13. A telescope drive lock assembly, comprising:
a mounting bracket operatively connected to a jacket assembly;
a first split nut and a second split nut being pivotally connected to the mounting bracket and disposed at least partially about an extension member of a telescope drive assembly that is configured to move the jacket assembly between an extended position and a retracted position in response to activation of an advanced driver assist system;
an engagement member operatively connected to the mounting bracket and the first split nut and the second split nut, the engagement member being movable between a first position and a second position; and
a split nut actuator operatively connected to the jacket assembly and disposed proximate a first end of the extension member.

14. The telescope drive lock assembly of claim 13, wherein in response to the jacket assembly being in the retracted position a plunger of the split nut actuator moves the engagement member from the first position towards the second position to open the first split nut and the second split nut such that the first split nut and the second split nut do not engage the extension member.

15. The telescope drive lock assembly of claim 14, further comprising:
a biasing member extending from a retainer plate that is operatively connected to the jacket assembly and is disposed proximate a second end of the extension member.

16. The telescope drive lock assembly of claim 15, wherein the biasing member extends from the retainer plate towards the mounting bracket.

17. The telescope drive lock assembly of claim 16, wherein in response to the jacket assembly being moved towards the extended position, the biasing member engages the mounting bracket and biases the mounting bracket towards the first end of the extension member.

18. The telescope drive lock assembly of claim 17, wherein the biasing of the mounting bracket towards the first end of the extension member the engagement member moves from the second position towards the first position to close the first split nut and the second split nut such that the first split nut and the second split nut engage the extension member to inhibit movement of the jacket assembly away from the extended position.

* * * * *